United States Patent [19]

Smith

[11] Patent Number: 4,763,641

[45] Date of Patent: Aug. 16, 1988

[54] SOLAR ENERGY ABSORBER

[76] Inventor: William F. Smith, 454 DeSoto Dr., New Smyrna Beach, Fla. 32069

[21] Appl. No.: 117,504

[22] Filed: Nov. 6, 1987

Related U.S. Application Data

[63] Continuation-in-part of Ser. No. 867,943, May 29, 1986, abandoned.

[51] Int. Cl.⁴ .............................................. F24J 3/02
[52] U.S. Cl. .................................... 126/444; 126/440; 165/170
[58] Field of Search ............... 126/426, 444, 901, 417, 126/432, 440, 448, 449; 165/170

[56] References Cited

U.S. PATENT DOCUMENTS

| | | | |
|---|---|---|---|
| 4,290,413 | 9/1981 | Goodman et al. | 126/426 |
| 4,471,759 | 9/1984 | Anderson et al. | 126/426 |
| 4,504,553 | 3/1985 | Aubert et al. | 126/901 |

FOREIGN PATENT DOCUMENTS

| | | | |
|---|---|---|---|
| 1069006 | 1/1981 | Canada | 126/446 |
| 2722613 | 12/1977 | Fed. Rep. of Germany | 126/426 |
| 0132998 | 11/1978 | Fed. Rep. of Germany | 126/449 |

*Primary Examiner*—Samuel Scott
*Assistant Examiner*—Carl D. Price
*Attorney, Agent, or Firm*—William F. Smith

[57] ABSTRACT

A solar energy absorber module having a molded top sheet of translucent plastic material and a molded bottom sheet of solar absorbing plastic material bonded together by circular bond indentations in the body thereof spaced from each other a distance equal to the diameter of the circular bond thereby forming a plurality of convex lens-like elliptical sites for augmentation of solar energy and a plurality of longitudinal tortuous sinusoidal channels in communication with a header at each end of the module for passage of working fluid therethrough.

10 Claims, 2 Drawing Sheets

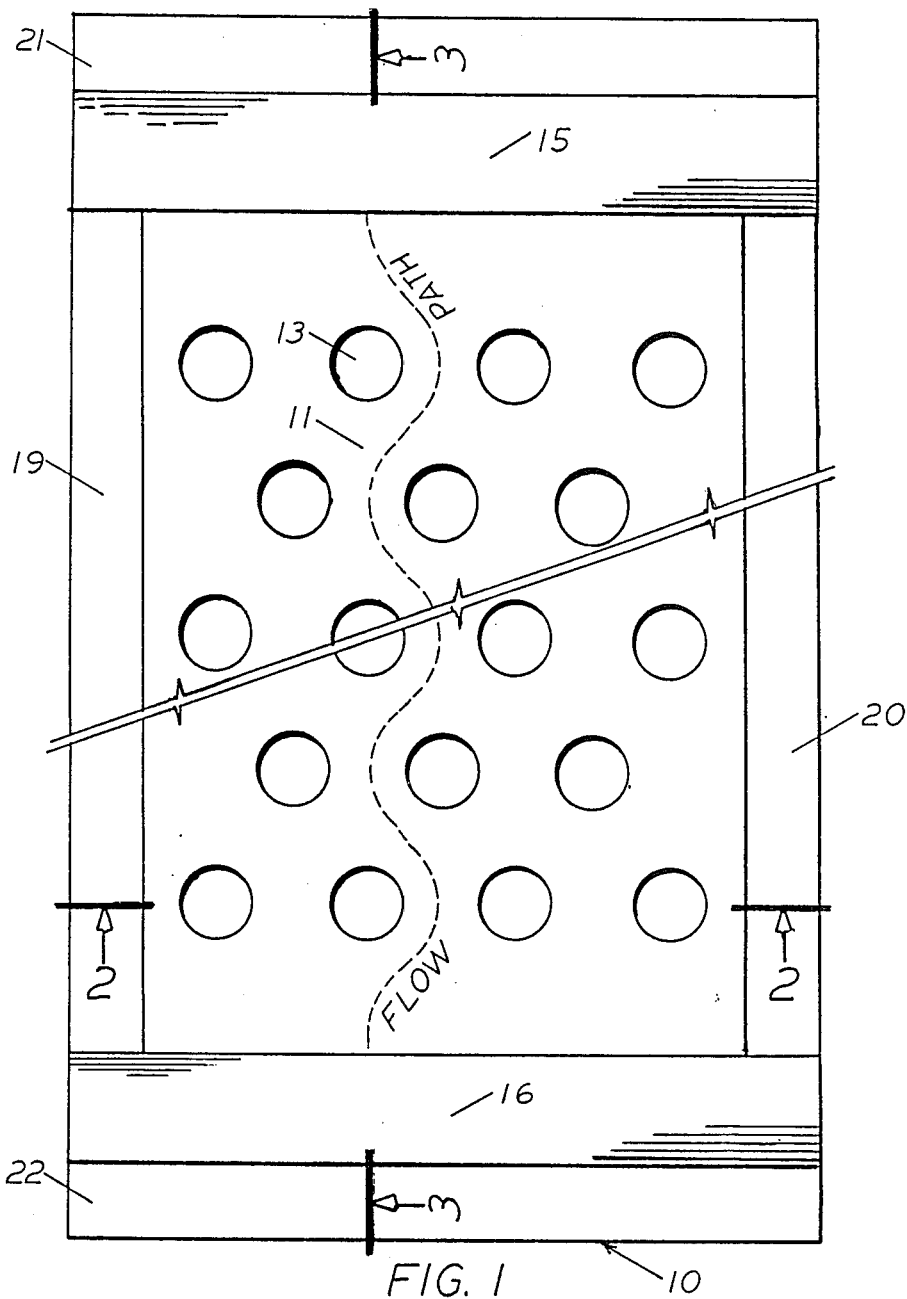
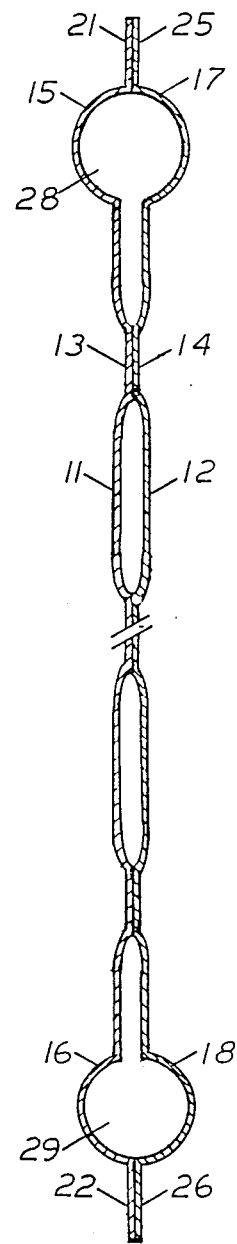
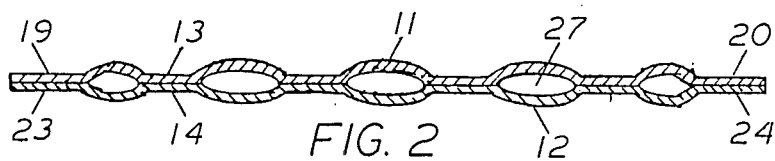
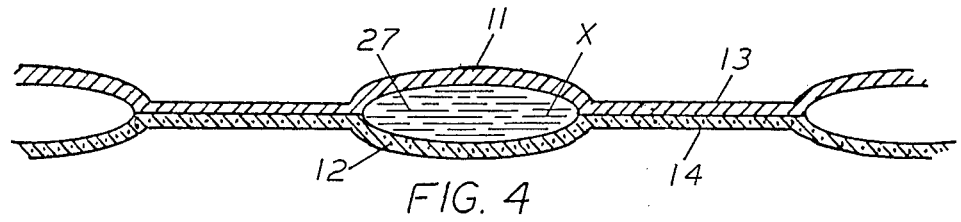
FIG. 1
FIG. 3
FIG. 2
FIG. 4

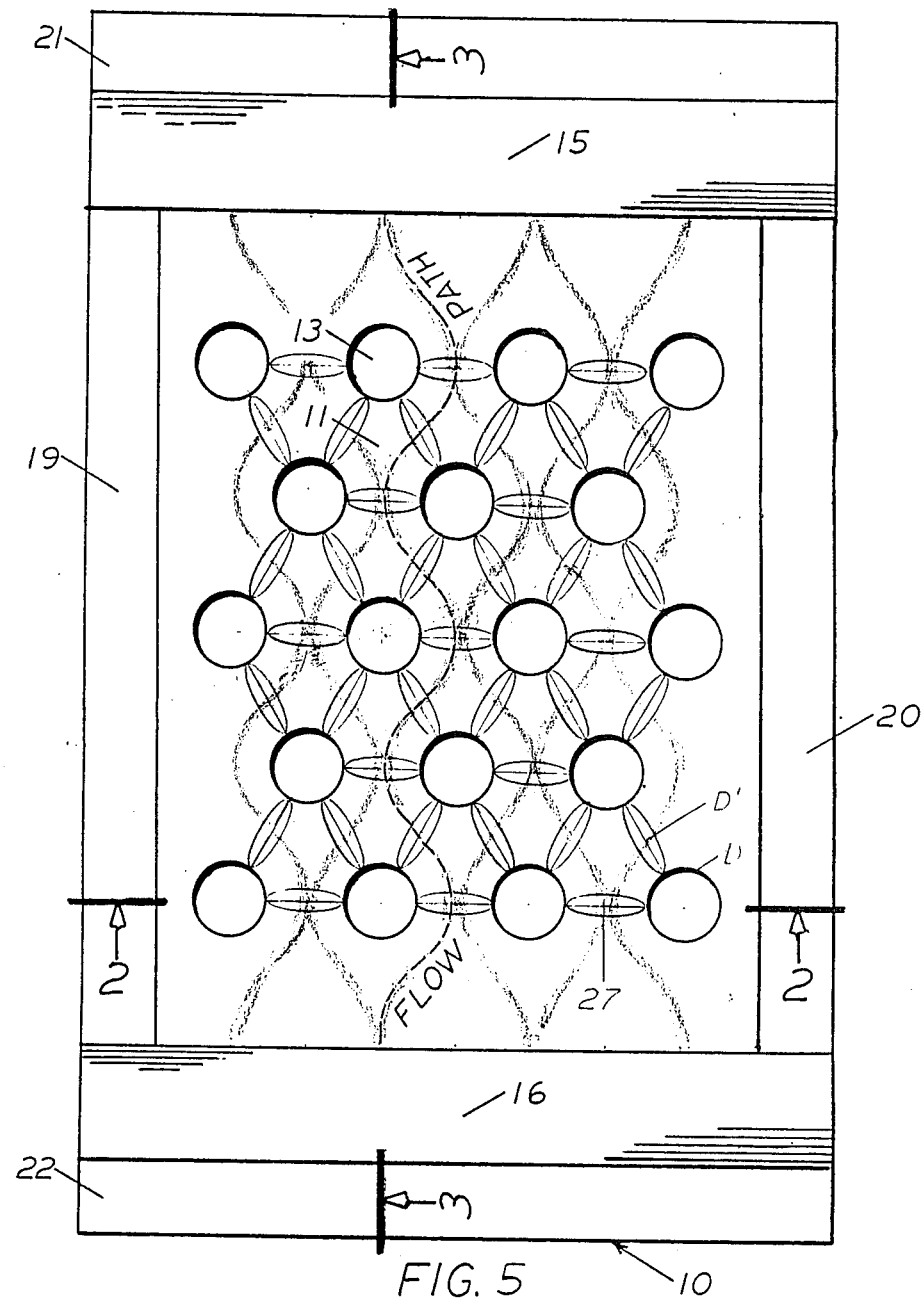
FIG. 5
 Convex lens elliptical cross-section site

SOLAR ENERGY ABSORBER

CROSS REFERENCE TO RELATED APPLICATION

This application is a continuation-in-part of applicant's prior application Ser. No. 06/867,943, filed May 29, 1986 for Solar Energy Absorber, now abandoned.

BACKGROUND OF THE INVENTION

A major drawback of large-scale solar energy use has been the initial cost of installation and relative inefficiencies of collection. The art is still generally saddled with expensive copper absorbers for intermediate temperature hot water heat, plastics of limited temperature range for low temperature pool heat, exotic and expensive composites for high temperature heat. The solar inventory on intermediate absorbers alone can become unwieldy in striving to accomodate the many sizes of collectors presently being distributed to the market place. Except for pool heating, of the various configurations using plastic materials which have been proposed, none to date has been commercially significant. Thus, the present invention is directed toward providing a simple, inexpensive, durable solar energy absorber adapted to serve low, intermediate and high temperatures.

The teachings set forth in applicant's co-pending application provide for low, intermediate and high temperature solar collectors having the advantage of increased solar collection by means of lens augmention for the absorber and a wide range of solar acceptance angles.

SUMMARY OF THE INVENTION

An adjunct and primary object of the present invention with respect to its parent application is to provide a more detailed description of the solar absorber having a structural geometry capable of augmenting the solar energy absorbed by passing sunlight through translucent curved lens-like structural material to refract and concentrate the light onto subjacent black body curved structural material. It is acknowledged that one of the principal constraints in using concentrating collectors is the necessity for tracking the sun. The geometry of the present invention utilizing 360° circular bond indentations provides a fixed concentrator absorber for lens augmentation of solar energy having a wide range of acceptance angles year-round over which the absorber collects sunlight.

Still another object of this invention is to provide a solar absorber module for interconnection with like modules by conventional insert to fit into small or large solar collector box structures or directly applied to a large area such as a roof. Solar collectors for swimming pools, generally, are solar absorbers directly applied to a roof structure ajacent the pool without box structure and glazing. Thus, the solar modules referred to herein as "solar shingles" may be utilized for low, intermediate and high temperature without change thereby minimizing inventory requirements while maximizing absorber designs and applications.

The foregoing and other objects, advantages and characterizing features of this invention will become clearly apparent from the ensuing detailed description of an illustrative embodiment thereof, taken together with the accompanying drawings wherein like reference numerals denote like parts throughout the various views.

DESCRIPTION OF THE DRAWINGS

A more complete appreciation of the invention and many of the attendant advantages thereof will be readily obtained by reference to the following detailed description when considered in connection with the accompanying drawings, wherein:

FIG. 1 is a top view of a solar energy absorber module in accordance with this invention;

FIG. 2 is a sectional view of the absorber module taken on line 2—2 of FIG. 1;

FIG. 3 is a sectional view of the absorber module taken on line 3—3 of FIG. 1;

FIG. 4 is an enlarged, fragmentary transverse sectional view of a lens-like channel portion of the solar energy absorber incorporating the special geometry and structures of this invention; and FIG. 5 is a diagrammatic presentation of FIG. 1 showing the flow paths for working fluid and the plurality of sites for lens augmentation of solar energy.

DETAIL DESCRIPTION OF INVENTION

Referring now in detail to the accompanying drawings, FIG. 1, FIG. 2 and FIG. 3 a solar energy absorber and sections thereof are comprehensively designated 10. The absorber 10 comprises a resin impregnated top sheet 11 and a resin impregnated bottom sheet 12 having a plurality of circular bonding indentations 13 and 14, respectively, formed throughout the body of each sheet. The top sheet 11 has a transverse protruding semicircle 15 formed at one end thereof and a transverse protruding semicircle 16 formed at the other end. Similarly, the bottom sheet 12 has a transverse protruding semicircle 17 formed at one end thereof and transverse protruding semicircle 18 formed at the other end. Top sheet 11 has longitudinal bonding sections 19 and 20 each side thereof and has transverse bonding flanges 21 and 22 extending from semicircles 15 and 16, respectively. Similarly, bottom sheet 12 has longitudinal bonding sections 23 and 24 each side thereof and has transverse bonding flanges 25 and 26 extending from semicircles 17 and 18, respectively.

The resin impregnated sheets 11 and 12 as heretofore described are brought into alignment and resin bonded at the bonding sites. The lens-like elliptical channels 27 and headers 28 and 29 are formed within the bonded structure 10 for passage of working fluid therethrough.

Referring now to FIG. 4, the geometry of the upper surface 11 forms a convex lens 27 to refractively concentrate the insolation intensity that is incident upon the upper surface onto the curved subjacent black absorbent surface 12. The working fluid X should be a substantially clear liquid to maximize the lens effect. Also, the lens cross-section is elliptical instead of strictly biconvex to better accommodate incident angles of the sun throughout the year. The liquid may be water, such as tap water or pool water, or if freezing conditions are likely to be encountered a mixture of water and antifreeze solution such as the glycols or FREON may be used with a closed loop system.

The term "sheet" as used herein includes woven and knitted reinforced plastics commonly referred to as RP fabrics and composites thereof and non-woven reinforced plastics commonly referred to as RP mats and composites thereof. The individual rovings in conventional woven roving have a spatial configuration which is sinusoidal or "S" shaped due to the over-under basket weave construction. The non-woven individual rovings in knitted reinforced plastics have a knitted matrix such that the biaxial rovings remain straight and in the same plane.

The term "top sheet" as used herein refers to translucent structural material such as woven fiberglass fabric which is particularly preferred in view of its fast wet-out in manufacture and excellent end product clarity approaching transparent. The term "bottom sheet" as used herein refers to black body plastic structural material such as woven fiberglass fabric containing solar energy absorbing material such as black pigment of ferric oxide and carbon black, and non-woven composite mat such as International Paper Company 50% carbon fiber and 50% glass fiber 1 inch and 1.5 inch long, respectively. A particularly preferred absorbing material is obliquely chopped graphite fiber added with the resin. The graphite fiber adds strength as well as black body contribution to the absorber. The chopped fiber product is a thin flake about 0.25 inch long by 0.12 to 0.25 inch wide. The individual filaments have a diameter of about 0.315 mil and are lightly held together by sizing. The oblique cuts give tapered pointed ends to the dispersed individual filaments which in conjunction with the curved surface geometry of the invention provide a contributing trap for solar energy.

The term "resin" as used herein refers to thermoset resins such as epoxies, polyesters, phenolics, silicones and melamines. The epoxies are preferred and the resins may be extended up to about 60% by weight of minute glass spheres in the 6 to 50 micron range such as Potters Spheriglass 3000-CP-01 or 03. The minute glass spheres have reinforcement as well as filler values, contribute to better wet-out and stress distribution, contribute to translucency control for lens augmentation, and economy.

The term "carbon" and "graphite" are used interchangeably throughout the specification and claims as equated by generic structure.

The following examples illustrate preparation of the solar energy absorber of this invention.

EXAMPLES

Solar energy absorber modules were prepared in a simple press mold, molded and bonded at room temperature.

Referring now to FIG. 5, the module was "shingle" size being 8×17 inches for interconnection with replica modules to obtain the desired size. The circular bonding indentations were 0.5 inch in diameter and about 0.10 inch deep, transversely centered 1.0 inch apart and longitudinally centered 1.75 inch apart. With these dimensions, the circular bond indentations were spaced from each other a distance D' equal to the diameter D of the circular bond indentations which is 0.5 inch. This gave 98 bond sites and 278 lens sites in the body of the module which had a 0.5 inch longitudinal bond on each side. A 0.75 inch O.D. header at each end having a 0.5 inch transverse bond flange completed the module design. Due to the tortuous sinusoidal path the working fluid must take in passing around the fully interrupted internal bond sites, the effective length of path of working fluid through the absorber was increased in the order of 3.0 inches per longitudinal foot of the absorber. Accordingly, a 3×4 feet absorber of the invention performs as a 3×5 feet conventional straight path absorber. The elliptical lens-like working fluid channels 27 had a major axis of about 0.5 inch and minor axis of about 0.15 inch. Upon bonding, the size of the fluid channels varied slightly due to variations in sheets thickness, extent of resin fill and extenders.

EXAMPLE 1

The preparation of the module defined above comprised impregnating a biaxial fiberglass top sheet (fabric weight about 10 oz./sq.yd.) with a clear epoxy resin and press molding the top sheet. Impregnating a biaxial fiberglass bottom sheet of the same fabric weight with epoxy resin containing a black pigment of carbon, and press molding the bottom sheet in replica of the top sheet. The top and bottom sheets were bonded together and formed longitudinal tortuous sinusoidal channels for working fluid having a translucent lens augmenting top surface and a solar energy absorbing bottom surface with a header at each end for the complete module.

EXAMPLE 2

The preparation of a module as described in Example 1 was repeated with a polyester resin substituted for the epoxy resin.

EXAMPLE 3

The preparation of a module as described in Example 1 and Example 2 was repeated with the impregnating resins containing 30% by weight of minute glass spheres.

Having now fully described the invention, it will be apparent that changes and modifications can be made thereto without departing from the spirit or scope of the invention as set forth herein. This particularly applies to the "shingle" size modules of the examples which could be of a size to directly accommodate collectors. It has been found, however, that the shingle size is easy to handle, extremely tough and durable to withstand the rigors of shipping, installation, exposure and interconnection for whatever size, shape and use.

What I claim and desire to protect by Letters Patent is:

1. A solar energy absorber module comprising a molded substantially rigid top sheet of translucent plastic material and a molded substantially rigid bottom sheet of solar energy absorbing substantially opaque plastic material bonded together by circular bond indentations formed in each of said top sheet and said bottom sheet, said circular bond indentation on each sheet spaced from each other a distance equal to the diameter of the circular bond thereby forming a plurality of convex lens-like elliptical sites located between adjacent circular bond indentations for augmentation of solar energy, said circular bond indentations being formed in plural successive offset rows to define a plurality of longitudinal tortuous sinusoidal channels in communication with a header at each end of the module for passage of working fluid therethrough.

2. The solar energy absorber of claim 1 in which the solar energy absorber module is adapted for interconnection with like modules.

3. A solar energy absorber module comprising a molded substantially rigid top sheet of translucent plastic material having a plurality of circular bond indentations therein, said bond indentations spaced from each other a distance equal to the diameter of the circular bond indentations, said top sheet having a longitudinal bond indentation at each side thereof and a transverse protruding semicircle portion at opposing ends of said top sheet having a bond flange at each end of said top sheet, and a molded substantially rigid bottom sheet of solar absorbing substantially opaque plastic material bonded to the top sheet, said bottom sheet being a replica of the top sheet having the circular bond indentations, longitudinal bond indentations, semicircle portions and bond flanges in bonded alignment with the top sheet thereby forming a solar energy absorber module having a plurality of convex lens-like elliptical sites located between adjacent circular bond indentations for augmentation of solar energy, said circular bond indentations being formed in plural successive offset rows to define a plurality of longitudinal tortuous sinusoidal channels formed therein in communication with a header at each end of the module defined by said semicircular portions for passage of working fluid through said module.

4. The solar energy absorber of claim 3 in which the top sheet and bottom sheet comprise woven biaxial fiberglass sheets impregnated with thermoset resin.

5. The solar energy absorber of claim 3 in which the top sheet and bottom sheet comprise non-woven biaxial fiberglass sheets impregnated with thermoset resin.

6. The solar energy absorber of claim 3 in which the plastic sheets comprise a non-woven composite impregnated with thermoset resin containing up to about 60% by weight of minute glass spheres.

7. The solar energy absorber of claim 3 in which the bottom sheet of solar absorbing plastic material is a thermoset resin comprising black body carbon material as the absorbent.

8. The solar energy absorber of claim 7 in which the black body carbon material is incorporated in the thermoset resin.

9. The solar energy absorber of claim 7 in which the black body carbon material is coated on the bottom sheet.

10. The solar energy absorber of claim 7 in which the bottom sheet of solar absorbing plastic material is a thermoset resin containing chopped graphite fiber.

* * * * *